(12) United States Patent
Ogilvy et al.

(10) Patent No.: US 7,492,168 B2
(45) Date of Patent: Feb. 17, 2009

(54) SYSTEMS AND METHODS FOR RESISTIVITY MEASUREMENT

(75) Inventors: Richard D. Ogilvy, Kinoulton (GB); Philip I. Meldrum, Burton Joyce (GB); Oliver Kuras, Wollaton (GB); David Beamish, Edwalton (GB)

(73) Assignee: Natural Environment Research Council, Wiltshire (GB)

( * ) Notice: Subject to any disclaimer, the term of this patent is extended or adjusted under 35 U.S.C. 154(b) by 0 days.

(21) Appl. No.: 10/543,405

(22) PCT Filed: Jan. 22, 2004

(86) PCT No.: PCT/GB2004/000260

§ 371 (c)(1),
(2), (4) Date: Jul. 26, 2005

(87) PCT Pub. No.: WO2004/068172

PCT Pub. Date: Aug. 12, 2004

(65) Prior Publication Data

US 2006/0055418 A1    Mar. 16, 2006

(30) Foreign Application Priority Data

Jan. 28, 2003    (GB) ................................. 0301980.9

(51) Int. Cl.
*G01R 27/26*    (2006.01)
(52) U.S. Cl. ....................................... 324/683; 324/709
(58) Field of Classification Search ................. 324/683, 324/715, 709
See application file for complete search history.

(56) References Cited

U.S. PATENT DOCUMENTS

| | | | | |
|---|---|---|---|---|
| 3,973,181 | A | * | 8/1976 | Calvert ........................ 324/355 |
| 4,380,237 | A | | 4/1983 | Newbower |
| 5,258,708 | A | * | 11/1993 | Sadeghi et al. .............. 324/240 |
| 5,400,209 | A | * | 3/1995 | Moslehi ....................... 361/234 |
| 6,037,784 | A | * | 3/2000 | Smith .......................... 324/694 |
| 6,265,881 | B1 | * | 7/2001 | Meliopoulos et al. ....... 324/691 |
| 6,351,128 | B1 | * | 2/2002 | Johnston ..................... 324/357 |
| 6,731,114 | B1 | * | 5/2004 | Lagabrielle et al. ......... 324/372 |

(Continued)

FOREIGN PATENT DOCUMENTS

FR    2 782 170    2/2000

(Continued)

OTHER PUBLICATIONS

International Search Report for PCT/GB2004/000260 dated Jun. 15, 2004.

(Continued)

*Primary Examiner*—Vincent Q Nguyen
(74) *Attorney, Agent, or Firm*—Nixon & Vanderhye P.C.

(57) ABSTRACT

Disclosed is a measurement system for measuring subsurface resistivity. The surfaces of interest are, for example, engineered surfaces such as roads and dams, and non-engineered surfaces such as greenfield sites. The measurement system may also be used on biological materials. The system includes signal input electrodes for inputting an input signal into subsurface material by capacitive coupling. Pairs of signal detection electrodes allow capacitive coupling detection of a detectable signal caused by the input signal in at least some of the subsurface material. A phase-sensitive meter such as a lock-in amplifier is provided to measure the amplitude and phase of the detectable signal.

22 Claims, 6 Drawing Sheets

U.S. PATENT DOCUMENTS 6,740,036 B1 * 5/2004 Lee et al. .................... 600/437
6,809,521 B2 * 10/2004 Tabarovsky et al. ......... 324/374
6,956,376 B2 * 10/2005 Salamitou ................... 324/444

FOREIGN PATENT DOCUMENTS

GB 2 217 460 10/1989

OTHER PUBLICATIONS

Kuras et al, "Non-Invasive Characterisation Of Road Subgrade With Towed-Array Capacitive Resistivity Imaging", Near Surface 2004—10th EuropeanMeeting of Environmental and Engineering Geophysics, Utrecht, The Netherlands, Sep. 6-9, 2004.

Kuras et al, "Detection Of Abandoned Mineshafts Using Towed-Array Capacitive Resistivity And Real-Time Kinematic GPS Navigation", 9th Annual Meeting EAGE—Environmental & Engineering Geophysics Society, Prague, Czech Republic, Aug. 31-Sep. 1, 2003.

Kuras et al, "Fundamentals of the capacitive resistivity technique", Geophysics, Apr. 12, 2005 (in press).

Kuras et al, "Capacitive Resistivity Imaging With Towed Arrays", SAGEEP Symposium 2003, St. Antonio, Texas, Apr. 6-10, 2003.

Kuras et al, "Fundamentals of the capacitive resistivity technique", Geophysics 71(3):G135-G152 (2006).

* cited by examiner

SYSTEMS AND METHODS FOR RESISTIVITY MEASUREMENT

This application is the US national phase of international application PCT/GB2004/000260 filed Jan. 22, 2004 which designated the U.S. and claims benefit of GB 0301980.9, filed Jan. 28, 2003 the entire contents of each of which are hereby incorporated by reference.

The present invention relates to resistivity measurements of matter located beneath a surface. A system and a method for carrying out such measurements are disclosed.

Subsurface resistivity measurements have various uses. Where the surface is the surface of the ground, for example, resistivity measurements of the subsurface matter can give important information about the structure and composition of that subsurface matter. Defects or inhomogeneities in the subsurface material tend to provide different electrical resistivities than the surrounding, non-defective or homogeneous material. Thus, a measurement of electrical resistivity along a measurement path which intersects a defect or inhomogeneity gives rise to a different measurement result than a measurement along a measurement path consisting only of non-defective or homogeneous material.

It is known that direct, galvanic measurements of electrical resistance can be made using, for example, a four-point Ohmic measurement. Such a measurement requires four electrodes, each of which is inserted into the surface. An electrical current is driven along a subsurface current path between two electrodes. The other two electrodes allow a measurement of the voltage difference between two points in the current path. This measured voltage allows a resistance value to be calculated, provided that the current is known. The determination of resistivity of the subsurface material can be relatively complex. There exist known methods for determining the resistivity of subsurface material from resistance measurements made in the way described above. (Telford, W. M. Geldart, L. P., and Sheriff, R. E. 1990, Applied Geophysics: Cambridge University press, $2^{nd}$ Edition).

It is also known that a volumetric map of subsurface resistivity may be constructed by taking a series of voltage/resistivity measurements of the type described above at different locations. These measurements may be combined and analysed to give a three dimensional representation of the local resistivity in an array of discrete volumes of the subsurface material. (Tsourlos P I and Ogilvy R D, 1999, "An algorithm for the 3D inversion of tomographic resistivity and induced polarisation data: preliminary results", *Journal of the Balkan Geophysical Society*, Vol 2, No. 2: 30-45. Tsourlos P I and Ogilvy R D, 2000, "An algorithm for the fast inversion of time-lapse resistivity data", *Proceedings, $6^{th}$ Annual Meeting Environmental & Engineering Geophysics Society*, Bochum, Germany, 2000. Mackie R L and Madden T R, "3D resistivity forward modelling and inversion using conjugate gradients", 1995, Geophysics, Vol 60, No. 5, 1313-1325.) The contents of these publications are hereby incorporated by reference in their entirety.

The use of electrodes which penetrate the surface to inject current or to measure voltage can be suitable where the surface is earth, for example. Particularly suitable locations are greenfield sites where the surface of the ground is undisturbed. In such cases, the insertion of electrodes into the ground is not usually problematic. However, where the surface of interest is a built structure, such as a paved road, pavement, bridge, building or the like, it may not be possible or desirable to insert electrodes into the surface of the structure. Inserted electrodes may not have a good galvanic contact and may weaken and/or disfigure the surface.

A known method to measure resistances whilst avoiding the insertion of electrodes into a surface uses the phenomenon of capacitive coupling to induce an alternating current flow in a subsurface material. The alternating current flow is induced by two capacitively coupled signal input electrodes and the resultant voltage due to the resistance of the subsurface material is detected by two capacitively coupled voltage detection electrodes.

Using capacitively coupled electrodes, it is not necessary to insert the electrodes into the surface. Instead, the electrodes can be placed near to the surface. An electrode array can therefore be readily scanned over a surface of interest to build up a scan of the resistivity of an array of subsurface volumetric elements. Known devices include the CORIM system (Iris Instruments, Avenue Buffon, B. P. 6007, 45060 Orleans Cedex 2, France) and the OHM-MAPPER system (supplied by GEOMETRICS Inc., 2190 Fortune Drive, San Jose, Calif. 95131, USA). These devices are capable of being scanned over a surface to provide voltage measurement data from the subsurface material. This data can be manipulated to provide three dimensional resistivity information about the subsurface material.

The present inventors have realised that a drawback of the known capacitive coupling devices is due to the fact that the devices measure only the magnitude of the voltage signal detected by capacitive coupling. For the known devices this leads to inaccuracies in the calculated resistivity.

The present inventors have found that the measurement of amplitude and phase of the voltage signal detected by capacitive coupling can give rise to more accurate determinations of the resistivity of subsurface material.

Accordingly, in a general aspect, the present invention provides measurement of amplitude and phase of the voltage signal detected by capacitive coupling.

Preferably, in a first aspect, the present invention provides a subsurface resistivity measurement system having:

a pair of signal input electrodes for inputting an input signal into subsurface material by capacitive coupling;

a pair of signal detection electrodes for capacitive coupling detection of a detectable signal caused by the input signal in at least some of the subsurface material; and a phase-sensitive meter for measurement of the amplitude and phase of the detectable signal.

Preferably, in a second aspect, the present invention provides a method for providing a measurement of resistivity of subsurface material, including the steps of:

inputting by capacitive coupling an input signal to a subsurface material;

detecting by capacitive coupling a detectable signal caused by the input signal in at least some of the subsurface material; and determining the amplitude and phase of the detectable signal.

The following preferred features may be applicable to any one or all of the general, first or second aspects of the invention.

Preferably, the detectable signal is a voltage signal. Typically, the system is operable so that an input current signal is induced in the subsurface material. The system therefore preferably includes means for determining the magnitude and/or phase of the input current signal. For example, this means may be means for determining the current signal applied to at least one of the signal input electrodes. The current signal is typically an alternating current signal.

The passage of current through the subsurface material is along a current path between the signal input electrodes. The current path can be of complex and intricate shape. The subsurface material from which a detection signal is detected by the system is not necessarily only the subsurface material which lies on a direct path between the current electrodes. The surface of interest may be the surface of the ground. The surface may be an engineered surface, such as a paved, metalled, concrete, tarmac or similar surface. The surface may also be the surface of an engineered structure such as a building, wall, masonry, dam or bridge. The subsurface material may be formed of the same material as the surface, or it may be different.

Preferably, the detection system is capable of detecting a detection signal from subsurface material at a depth from the surface of up to 20 m, this depth typically being partly dependent on the electrical properties of the subsurface material. More preferably, the maximum depth is 10 m or even 5 m.

In certain embodiments, the subsurface material may be biological material such as plant, animal or human tissue. The surface in such cases would typically be the surface of the plant (e.g. tree) or the surface (e.g. skin) of the animal or human person. The system may therefore be used in vivo for non-invasive imaging of tissue. It may also be used for ex vivo or in vitro measurements or imaging.

Preferably, the system is adapted so that the signal input electrodes and/or the signal detection electrodes do not make galvanic contact and/or physical contact with the subsurface material. Preferably, the electrodes do not make galvanic contact and/or physical contact with the surface.

The system may be adapted to be moved or scanned over a surface of interest whilst collecting data. This allows a series of data measurements to be built up quickly. The electrodes may be moved independently of the remainder of the system or the whole system may be moved during measurement. The advantage of moving or scanning the electrodes and/or the whole system is that the time-consuming process of inserting electrodes into the surface is avoided. This can improve the speed of the data collection and/or can improve the resolution of the data collected. Furthermore, the number of individual data measurement locations is not determined by the number of discrete electrode insertion operations which are made, but by the number of measurements which are taken during a scan. This can be set by an operator during use, if necessary.

Alternatively, the system may be adapted for use in a stationary mode. For example, the system may be spatially fixed with respect to a surface, allowing measurements (e.g. continuous or periodic) of the same subsurface material.

The system may include a plurality of signal detection electrodes. Additionally or alternatively, the system may include a plurality of signal input electrodes. The electrodes may be located in electrode arrays. The use of more than one pair of electrodes for signal detection allows more data to be collected, which may contain information about different depths of investigation. The electrodes may be in the form of plates. Typically, the plate-like electrodes are insulated from direct (galvanic) electrical contact with the surface. Such electrodes can therefore be placed in physical contact with the surface (with only the insulation making contact with the surface) and moved relative to that surface. This is a useful adaptation, since the insulation allows the electrically conducting electrode material to be kept a fixed distance (the thickness of the insulation) from the surface.

Preferably, the system includes a circuit for direct measurement of the input signal applied to the input electrodes. Measurement of the input signal allows the resistivity of the subsurface material to be calculated from the detected signal.

Preferably, the system has means for providing a floating reference voltage for comparison with the measured detection signal. This has the advantage that the system does not need any galvanic contact with the ground, since a ground voltage reference is not required. This can help to avoid offsets and/or drift.

Preferably, the phase-sensitive meter is capable of measuring the amplitude and phase of the detected signal. Typically, the phase-sensitive meter is a dual-phase lock-in amplifier. Such an instrument allows the measurement of the in-phase (real) and out-phase (imaginary) components of the detected signal. Measurement of both of these components can give rise to a more accurate determination of resistivity for the subsurface material.

In addition the use of a lock-in-amplifier provides superior noise discrimination compared to conventional resistivity meters. Preferably, the system includes means for determining the relative positions of the electrodes. Also, the system may include means for determining the absolute positions of the electrodes with respect to the surface of interest, for example using known GPS (Global Positioning System) technology. This can allow the system to build up data concerning the spatial relation of the detected measurements.

Preferably, the system incorporates optical transmission means for connecting system components. Optical transmission reduces the risk of stray capacitive coupling interfering with the measurements.

In another aspect, the present invention provides a use either of a system according to the first aspect or of a method according to the second aspect wherein the system or method is used to determine the resistivity of subsurface material beneath an engineered surface such as a road, pavement, bridge, dam, building, wall, etc.

In another aspect, the present invention provides a use either of a system according to the first aspect or of a method according to the second aspect wherein the system or method is used to determine the resistivity of subsurface material beneath a non-engineered surface such as the surface of a greenfield site. In both cases, the subsurface material is often highly heterogeneous and therefore provides large differences in local resistivity.

In another aspect, the present invention provides a use either of a system according to the first aspect or of a method according to the second aspect wherein the system or method is used to determine the resistivity of subsurface material or tissue in a plant, animal or human body. Preferably, the measurement is performed on a tree. In that case, the electrodes can be placed close to the surface (bark) of the tree in order to detect resistivity variations which may, for example, indicate internal decay.

In another aspect, the present invention provides a use either of a system according to the first aspect of or a method according to the second aspect wherein the system or method is used to determine the resistivity of subsurface material beneath the outer surface of a pipe or pipeline. In the case of oil, gas or water pipelines, it is often important to determine whether leaks, waxing, furring or corrosion of the pipe is occurring. Such problems can affect flow rates and can also be safety concerns. Known stand-off remote sensing platforms (e.g. satellites or helicopters with multispectral or radar imagery) are not effective in circumstances where measurements from the interior of the pipe are required. The present invention allows non-invasive measurements of resistivity to be taken of the interior of the pipe.

Preferred embodiments of the present invention will now be described, by way of example, with reference to the accompanying drawing, in which:

FIG. 4: x-y plane, z=0 m. FIG. 5: x-z plane, y=0 m. FIG. 6: y-z plane, x=−2.5 m.

Figure 1A:
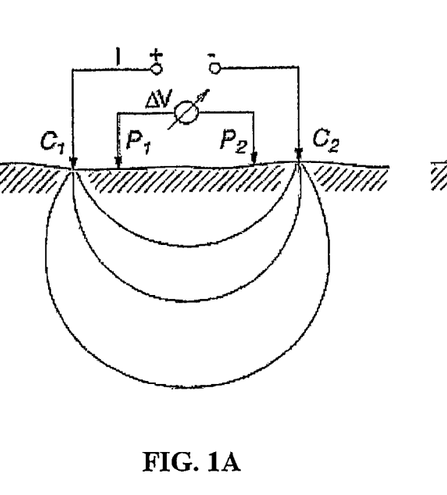
FIG. 1A shows a schematic sectional view of a known DC resistivity measurement technique with galvanic contact.
Figure 1B:
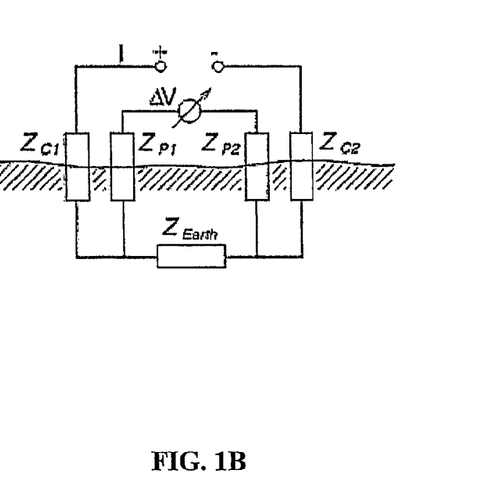
FIG. 1B shows a schematic equivalent electrical circuit model for FIG. 1A.

FIG. 1A shows, schematically, a sectional view of a known technique for taking DC resistivity measurements of subsurface material. This technique uses galvanic contact between electrodes $C_1$, $C_2$, $P_1$, $P_2$ and the ground (shaded). An equivalent electrical circuit model is shown in FIG. 1B.

Figure 2A:
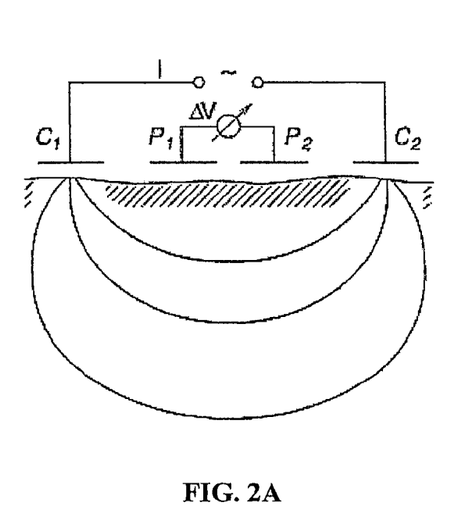
FIG. 2A shows a schematic sectional view of a known capacitive resistivity measurement technique.
Figure 2B:
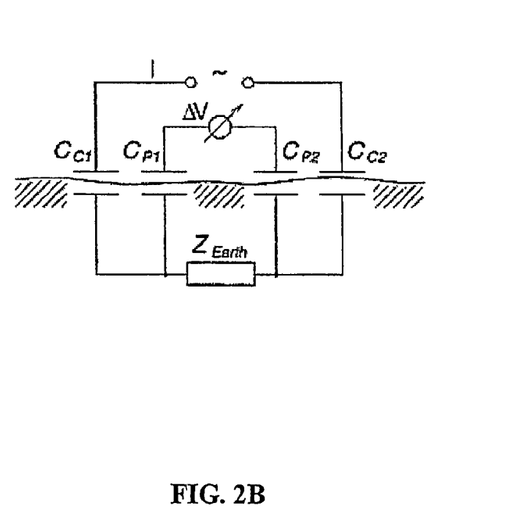
FIG. 2B shows a schematic simplified equivalent electrical circuit model for FIG. 2A.

FIG. 2A shows, schematically, a sectional view of a known technique for taking resistivity measurements of subsurface material using capacitive coupling. This technique requires capacitive coupling between electrodes $C_1$, $C_2$, $P_1$, $P_2$ and the ground (shaded). A simplified equivalent electrical circuit model is shown in FIG. 2B.

Figure 3:
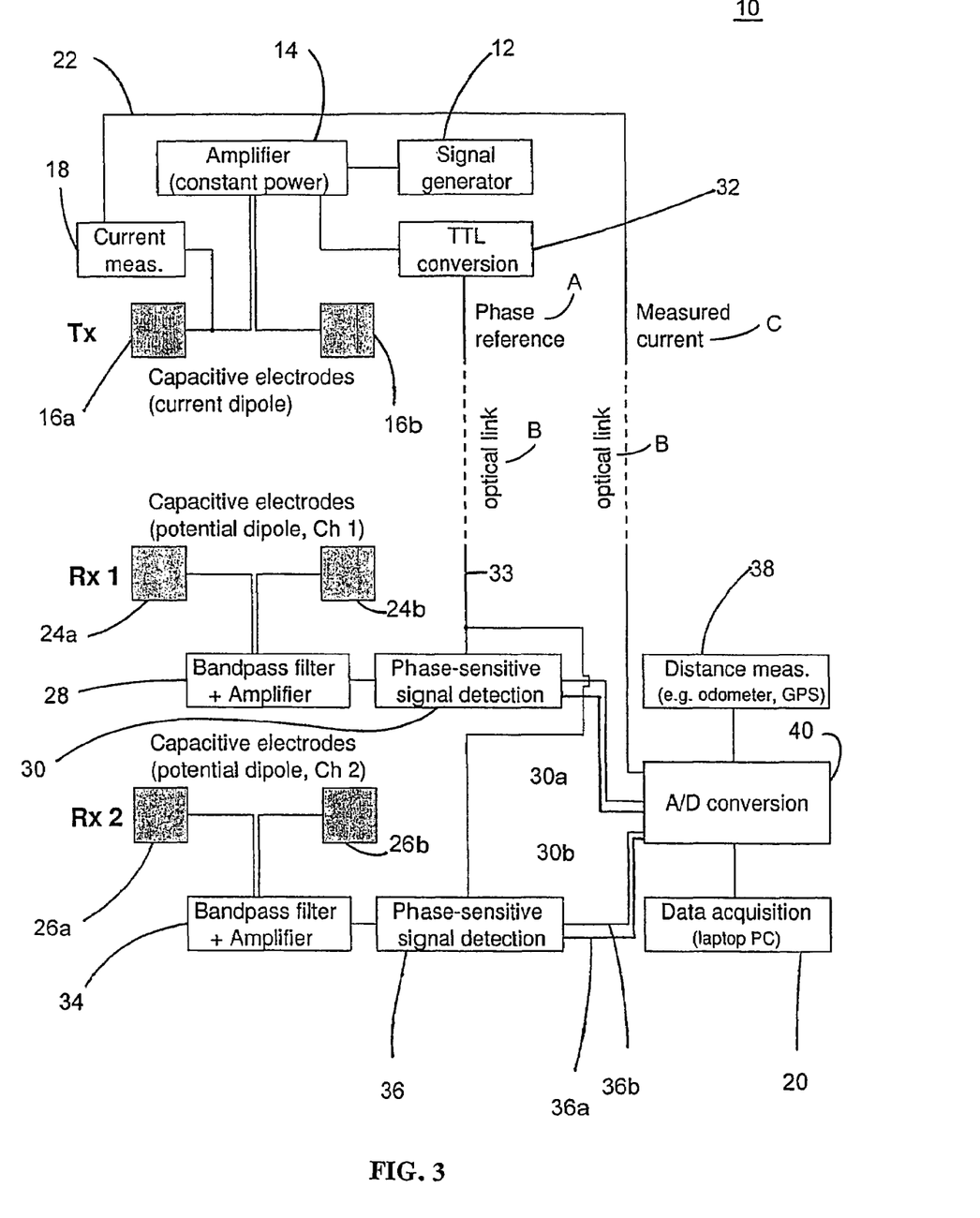
FIG. 3 shows a schematic layout of a capacitive resistivity measurement system according to an embodiment of the invention.

In one embodiment, the present invention provides a capacitive resistivity measurement system which is based around an electrostatic quadrupole. The schematic layout of the system 10 is shown in FIG. 3. On the transmitter side (i.e. the current injection components of the system), a monochromatic sinusoidal signal is generated by a signal generator 12. The signal is fed into a high-voltage, approximately constant power amplifier 14. Capacitive electrodes 16a and 16b are electrically connected to amplifier 14. This amplifier is designed to provide currents of the order of several mA when injected across the capacitive electrodes 16a,b. The system operates at a frequency of approximately 14.2 kHz which can be varied. Injection currents can be regulated to an upper limit of approximately 30 mA.

In the system 10, all components are powered by separate supplies to ensure galvanic decoupling. The use of 12 V batteries allows flexible and mobile operation of the system. Typically, the power consumption is designed so that the batteries require recharging at most once per day of field use.

Electrodes 16a,b are in the form of metallic plates. Each plate is covered by a thin coating of insulating material. Suitable known plastics materials may be used. Electrodes 16a,b form a current dipole. Testing has shown that simple plate-wire combinations are effective. For example, square metallic plates of side 25 cm and thickness 2 mm are effective. The plates are connected to the other components of the transmitter by short segments of thin wire. Such electrodes can be used for static surveys or can be mounted on towable platforms for mobile applications.

In dynamic applications, the current injected by the capacitive electrodes may vary significantly as the transmitter adapts to different surface conditions. For this reason, it is necessary to measure the current. This is done explicitly using a resistor (not shown) in the current path leading to one of the capacitive electrodes. The current through the resistor is measured by current measurement device 18. Data from the current measurement device is sent to a data acquisition device 20, which may a portable PC, via an fibre optic link 22.

At the receiver side of the system (i.e. the voltage detection components of the system) is shown two pairs of detection electrodes 24a,b and 26a,b. Two pairs are illustrated, but it will be clear that only one, or more than two, such potential dipoles may be employed.

Looking first at detection capacitive electrode pair 24a,b, the electrodes connect to a basic signal conditioning device 28. This consists of an analogue bandpass filter and amplifier, which may be located in the same device (as here) or in separate devices. Device 28 is located close to the electrodes 24a,b in order to reduce noise as much as possible. The cut-off frequencies of the bandpass filter (3 dB points) are approximately 1 kHz and 20 kHz. The bandpass filter serves two purposes. The lowpass component suppresses spectral energy from the upper VLF band and above. High frequency EM noise is often observed on sites in the built environment. The highpass component suppresses the spectral energy of the mains frequency (50 Hz in the UK) as well as low frequency motion-induced noise. Testing has revealed that the dominant frequency of such motion-induced noise is of the order of 20 Hz.

The signal from device 28 is presented to a dual-phase lock-in amplifier 30. The phase reference for the lock-in amplifier is provided by a TTL (Transistor Transistor Logic) conversion (via TTL converter 32) of a signal taken from the constant power amplifier 14. The phase reference signal is transmitted to the lock-in amplifier 30 via a fibre optic link 33. No external reference potential is provided for the lock-in amplifier. Instead, the potential measurement is performed in floating mode.

The principal components of a suitable lock-in amplifier are a multiplier, an RC circuit or integrator and a phase-shifting circuit. The lock-in amplifier can perform phase-sensitive detection of AC signals and can significantly improve the signal-to-noise ratio of weak electrical signals. Here, the lock-in amplifier 30 measures the in-phase and out-phase (quadrature) components of the potential across the receiver dipole formed by detection electrodes 24a,b. Experimental tests have shown that significant phase-shifts can occur but that subsurface resistivity is dependent only on the in-phase component of the detected signal. Therefore, for an accurate measurement of subsurface resistivity, a measurement of both the in-phase and out-phase components of the detected signal is necessary.

Performance tests with other instrumentation has shown that a dual-phase lock-in amplifier working in floating mode performs significantly better than, for example, a differential amplifier working with a reference potential. The use of a reference potential can cause considerable noise problems, particularly when the electrodes (or the whole system) is towed along a surface.

The output from lock-in amplifier 30 gives the signal detected by the first detection channel Rx 1. A second channel Rx 2 is provided by detection electrodes 26a,b. The signal between these electrodes is fed into an analogue bandpass filter and amplifier device 34 (similar to device 28). The potential from device 34 is presented to another dual-phase lock-in amplifier 36, which operates in the same way to lock-in amplifier 30, described above. The TTL reference is presented to the lock-in amplifiers by means Qf a fibre optic connection.

The signals from each lock-in amplifier, in-phase 30b 36b and out-phase 30c 36c, correspond to a single detection signal channel, Rx 1 or Rx 2. A further data channel transmitter (Tx) 22 corresponds to the output from current measurement device 18. A still further data channel is provided by a position sensing means 38 which measures the relative position of the electrodes with respect to a datum (e.g. by measuring the travel of the electrodes from the datum via an odometer). Alternatively, the position sensing means can measure the absolute position of the electrodes by using GPS technology to determine the coordinates of the system. For towed-array applications, data acquisition can be triggered by operation of the position sensing means 38.

All six of the channels are fed into a data acquisition module (a laptop PC) 20. The analogue signals are first converted into digital data using a 16-bit analogue-to-digital converter 40. With each potential measurement from channel Rx 1 or Rx 2, a data point is acquired synchronously from the current measurement device 18.

The current and voltage measurements (in-phase and out-phase) are then used to determine resistivity values for the subsurface material by using known techniques.

Figure 4:
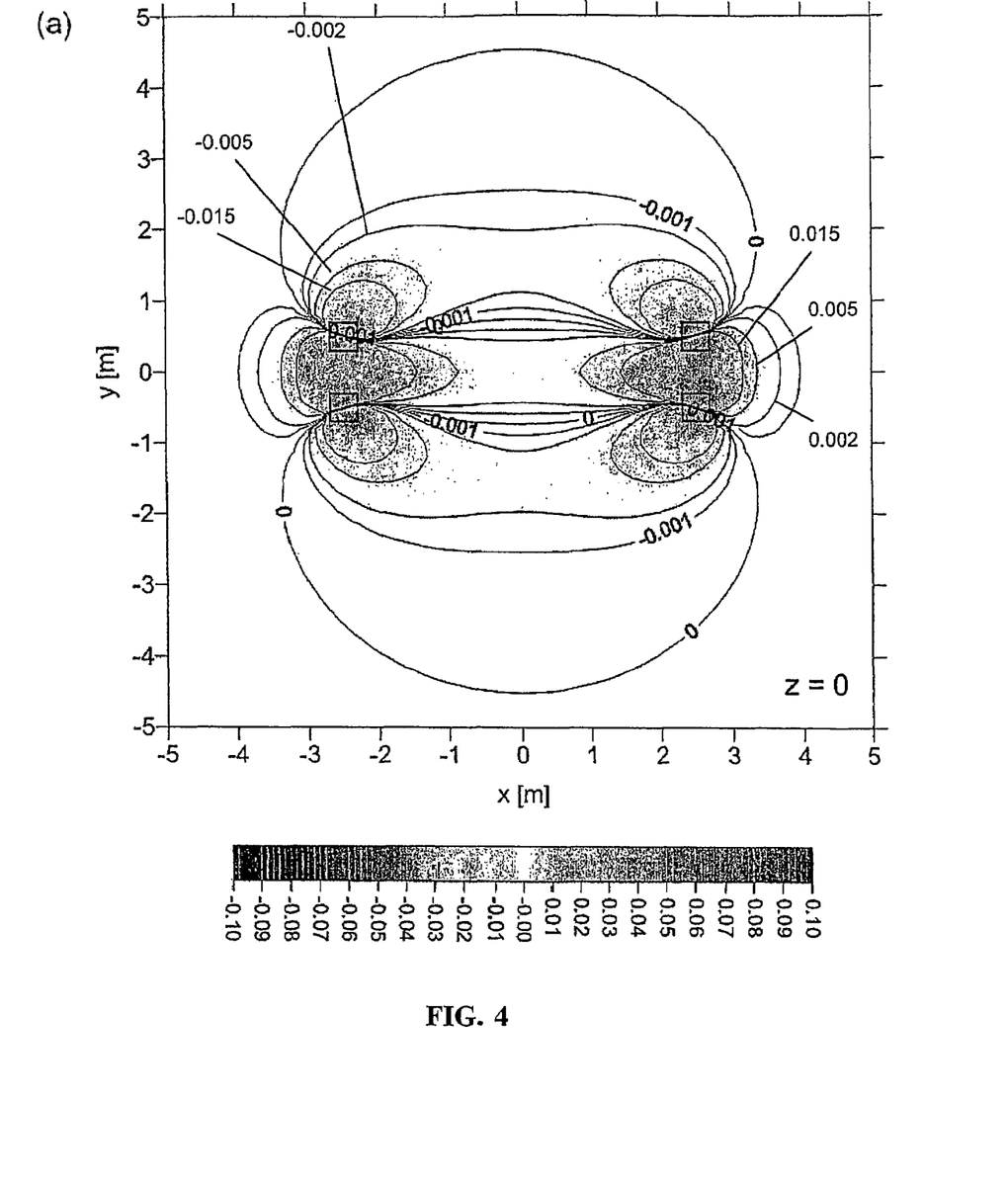
FIGS. 4-6 shows 3D sensitivity distributions (arbitrary units) for a capacitive resistivity measurement system according to an embodiment of the invention. The system uses an equatorial dipole-dipole array (l=1 m, r=5 m) in a homogeneous halfspace.
Figure 5:
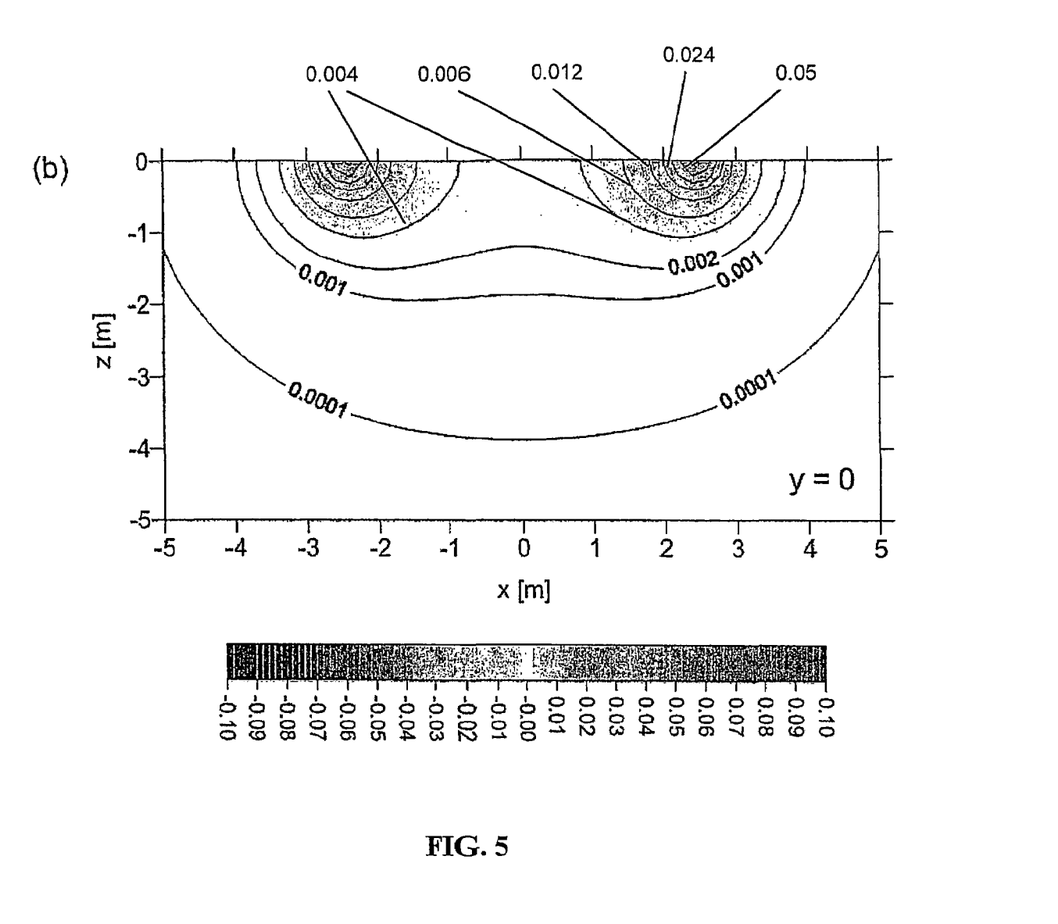
Figure 6:
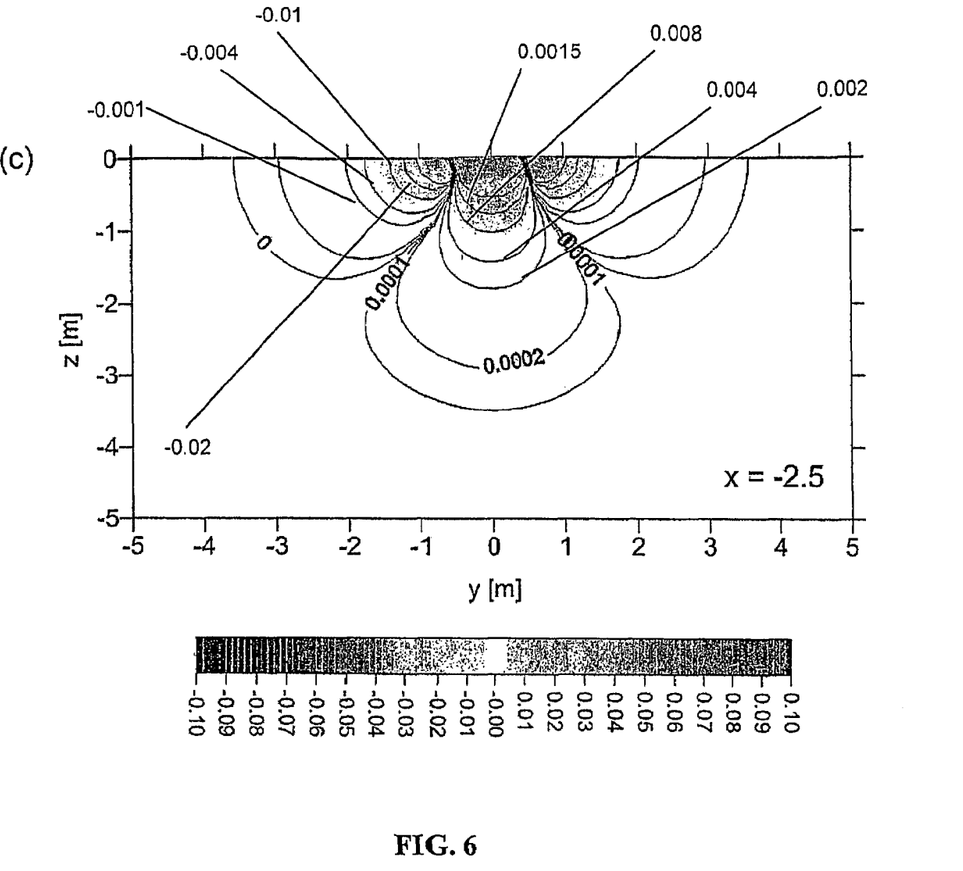

FIGS. 4-6 illustrate the 3D sensitivity distribution for the equatorial dipole-dipole array used in the invention. Here, l=1 m (along the y-axis), r=5 m (along the x-axis) and the distribution is shown for a homogeneous halfspace. The sensitivity function provides information on the degree to which a change in the resistivity of a region of the subsurface material will influence the electric potential measured by the array. Thus, the higher the value of the sensitivity value, the greater is the influence of that region of the subsurface material on the measurement. Note that these graphs originally used colour to represent sensitivity values. Approximate values for some contours are indicated on these drawings as a guide.

Figure 7:
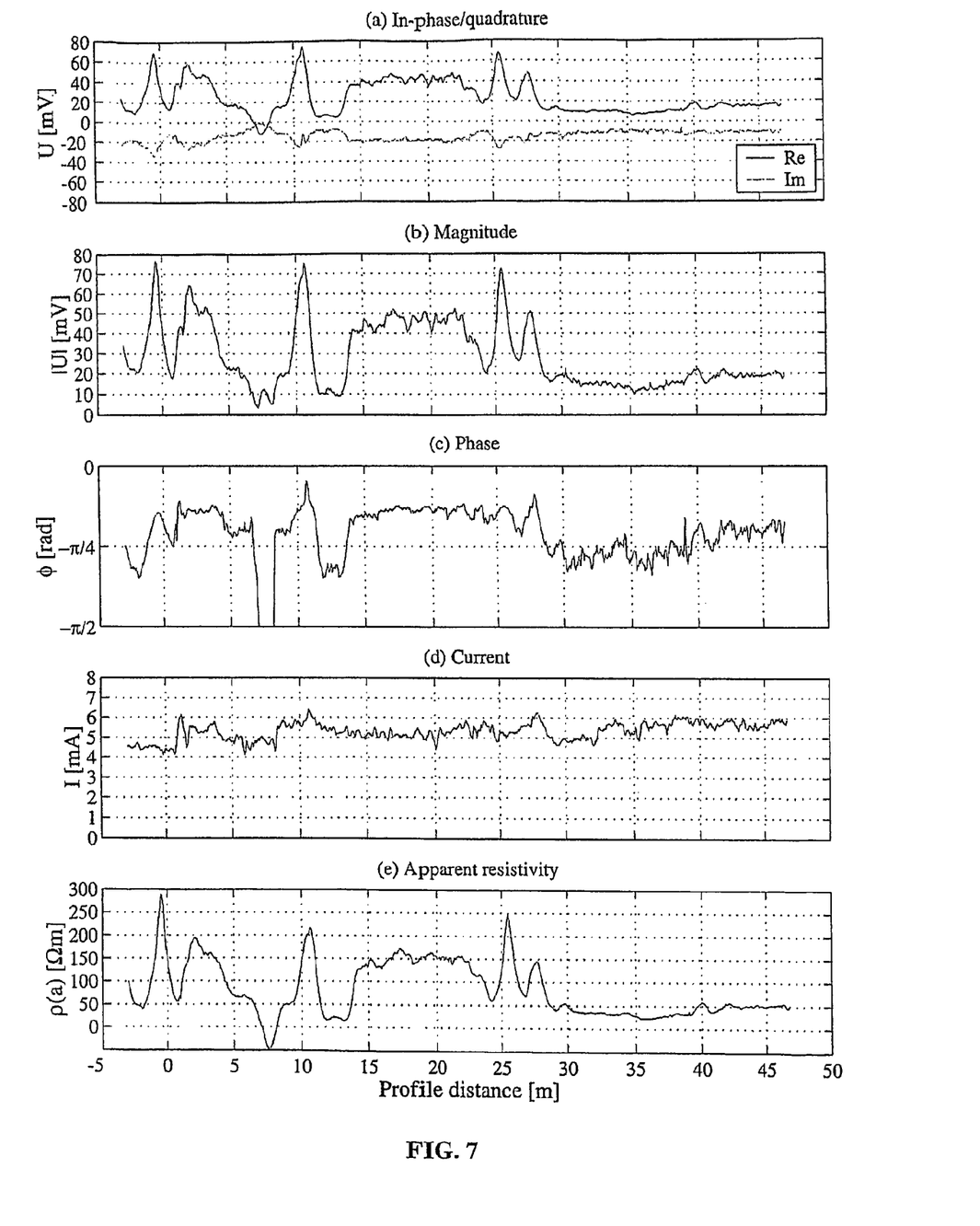
FIG. 7 shows apparent resistivity measurement profiles obtained according to an embodiment of the invention, using an equatorial dipole-dipole array with a separation of r=1.6 m, (a) complex potential (in-phase and quadrature); (b) magnitude; (c) phase; (d) current; (e) apparent resistivity.

FIG. 7 shows results collected using a system according to an embodiment of the invention. The results were collected on a tarmac road using an equatorial dipole-dipole array with a separation (r) of 1.6 m. FIG. 7(a) shows the complex potential (in-phase and quadrature). FIG. 7(b) shows the magnitude of the measured potential. FIG. 7(c) shows the phase of the measured potential. FIG. 7(d) shows the current injected. FIG. 7(e) shows the apparent resistivity measured. All of the plots (a)-(e) show data collected for a single depth of investigation (known as a single Tx-Rx separation). The plots demonstrate the high data density and resolution capabilities of the system of the embodiment.

The preferred embodiments have been described by way of example. Modifications of these embodiments, further embodiments and modifications thereof will be apparent to the skilled reader and as such are within the scope of the invention.

The invention claimed is:

1. A ground subsurface resistivity measurement system for measuring resistivity of subsurface material beneath a ground surface, the system comprising:
    a pair of signal input electrodes for inputting an alternating current input signal into the subsurface material by capacitive coupling;
    a pair of signal detection electrodes for capacitive coupling detection of a detectable signal caused by the input signal in at least some of the subsurface material; and
    a phase-sensitive meter for measuring, between about 1 kHz and about 20 kHz, the amplitude and the phase, relative to the input signal, of the detectable signal.

2. The measurement system according to claim 1 wherein the detectable signal is a voltage signal.

3. The measurement system according to claim 1 wherein the system is operable so that an input current signal is induced in the subsurface material, the system including means for determining the magnitude and/or phase of the input current signal.

4. The measurement system according to claim 1 adapted so that the signal input electrodes and the signal detection electrodes do not make galvanic contact with the subsurface material and do not make physical contact with the subsurface material.

5. The measurement system according to claim 4 adapted so that the signal input electrodes and the signal detection electrodes do not make galvanic contact with the surface.

6. The measurement system according to claim 1 adapted to be moved or scanned over a surface of interest whilst collecting data.

7. The measurement system according to claim 1 having a plurality of pairs of signal detection electrodes.

8. The measurement system according to claim 7 having a plurality of pairs of signal input electrodes.

9. The measurement system according to claim 1 wherein the electrodes are in the form of plates that are insulated from galvanic electrical contact with the surface.

10. The measurement system according to claim 1 having a circuit for direct measurement of the input signal applied to the input electrodes.

11. The measurement system according to claim 1 having means for providing a floating reference voltage for comparison with the measured detection signal.

12. The measurement system according to claim 1 wherein the phase-sensitive meter is a dual-phase lock-in amplifier.

13. The measurement system according to claim 1 having means for determining the relative positions of the electrodes.

14. The measurement system according to claim 1 having optical transmission means for connecting system components.

15. The measurement system according to claim 1 having means for determining the absolute positions of the electrodes.

16. The measurement system according to claim 15 wherein means for determining the absolute positions of the electrodes uses GPS technology to determine the coordinates of the system.

17. The method for providing a measurement of resistivity of subsurface material beneath a ground surface, the method comprising the steps of:
    inputting by capacitive coupling an alternating current input signal into the subsurface material;
    detecting by capacitive coupling a detectable signal caused by the input signal in at least some of the subsurface material;
    determining, between about 1 kHz and about 20 kHz, the amplitude and the phase, relative to the input signal, of the detected signal; and
    determining a structure of the subsurface material based on said measurement of resistivity.

18. A ground subsurface resistivity measurement system for measuring resistivity of subsurface material beneath a ground surface, the system comprising:
    a signal generator for generating an input signal having a predetermined frequency,
    a pair of signal input electrodes for inputting the input signal into the subsurface material by capacitive coupling,
    a pair of signal detection electrodes for detecting by capacitive coupling a detectable signal caused by the input signal in at least some of the subsurface material,
    a signal conditioning device connected to the pair of signal detection electrodes for filtering from the detected signal frequencies below approximately 1 kHz and above approximately 20 kHz, and a phase-sensitive signal detection device connected to the signal conditioning device for determining the amplitude and the phase, relative to the input signal.

19. The measurement system according to claim 18 further comprising an amplifier for amplifying the output signal generated by the signal generator, and a current detector for measuring current in the input signal.

20. The measurement system according to claim 15 wherein the amplifier operates at a frequency of approximately 14.2 kHz, which can be varied.

21. The measurement system according to claim 15 further comprising a logic conversion circiut and an optical link for providing to the phase-sensitive signal detection device a phase reference signal from the amplifier.

22. The measurement system of claim 16 wherein the phase-sensitive signal detection device is a dual phase lock-in amplifier.

* * * * *